United States Patent
Dec

(10) Patent No.: US 6,702,266 B1
(45) Date of Patent: Mar. 9, 2004

(54) DAMPING STRUT

(75) Inventor: Andrzej Dec, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 10/302,477

(22) Filed: Nov. 22, 2002

(51) Int. Cl.⁷ .............................. F16H 7/08; F16F 7/08
(52) U.S. Cl. ..................................... 267/205; 267/202
(58) Field of Search ................................ 188/129, 136, 188/381; 267/196, 201, 202, 205, 209; 474/133, 135, 138

(56) References Cited

U.S. PATENT DOCUMENTS

| | | | |
|---|---|---|---|
| 2,237,318 A | 4/1941 | Snyder | 188/129 |
| 2,429,140 A | 10/1947 | Snyder | 267/9 |
| 2,507,760 A | 5/1950 | Dath | 188/129 |
| 3,866,724 A | 2/1975 | Hollnagel | 188/129 |
| 4,606,442 A | 8/1986 | Paton et al. | 188/381 |
| 4,738,437 A | 4/1988 | Paton et al. | 267/196 |
| 5,133,435 A | 7/1992 | Taylor | 188/381 |
| 5,369,952 A | 12/1994 | Walters | 60/39.31 |

FOREIGN PATENT DOCUMENTS

| | | | | |
|---|---|---|---|---|
| DE | 4203449 | * | 8/1993 | |
| EP | 0812999 B1 | | 4/1997 | F16F/7/09 |

* cited by examiner

*Primary Examiner*—Christopher P. Schwartz
(74) *Attorney, Agent, or Firm*—J. A. Thurnau, Esq.; C. H. Castleman, Esq.; S. G. Austin, Esq.

(57) ABSTRACT

A damping strut. An inner damping member is axially engaged with an outer housing. The outer housing is connectable to a tensioner arm. A wedge member connected to an immoveable mounting member is axially engaged with an inner portion of the inner damping member. The outer housing is axially moveable relative to the wedge member. A spring bears upon and urges the outer housing away from an end cap. The end cap comprises a rod, which extends axially within the wedge member and has an end connected to the inner damping member. The rod transmits a spring load force from the end cap to the inner damping member such that the inner damping member radially expands against the outer housing in response to the spring load force, thereby creating a frictional force between the inner damping member and the outer housing which damps an outer housing movement in proportion to the spring force.

18 Claims, 5 Drawing Sheets

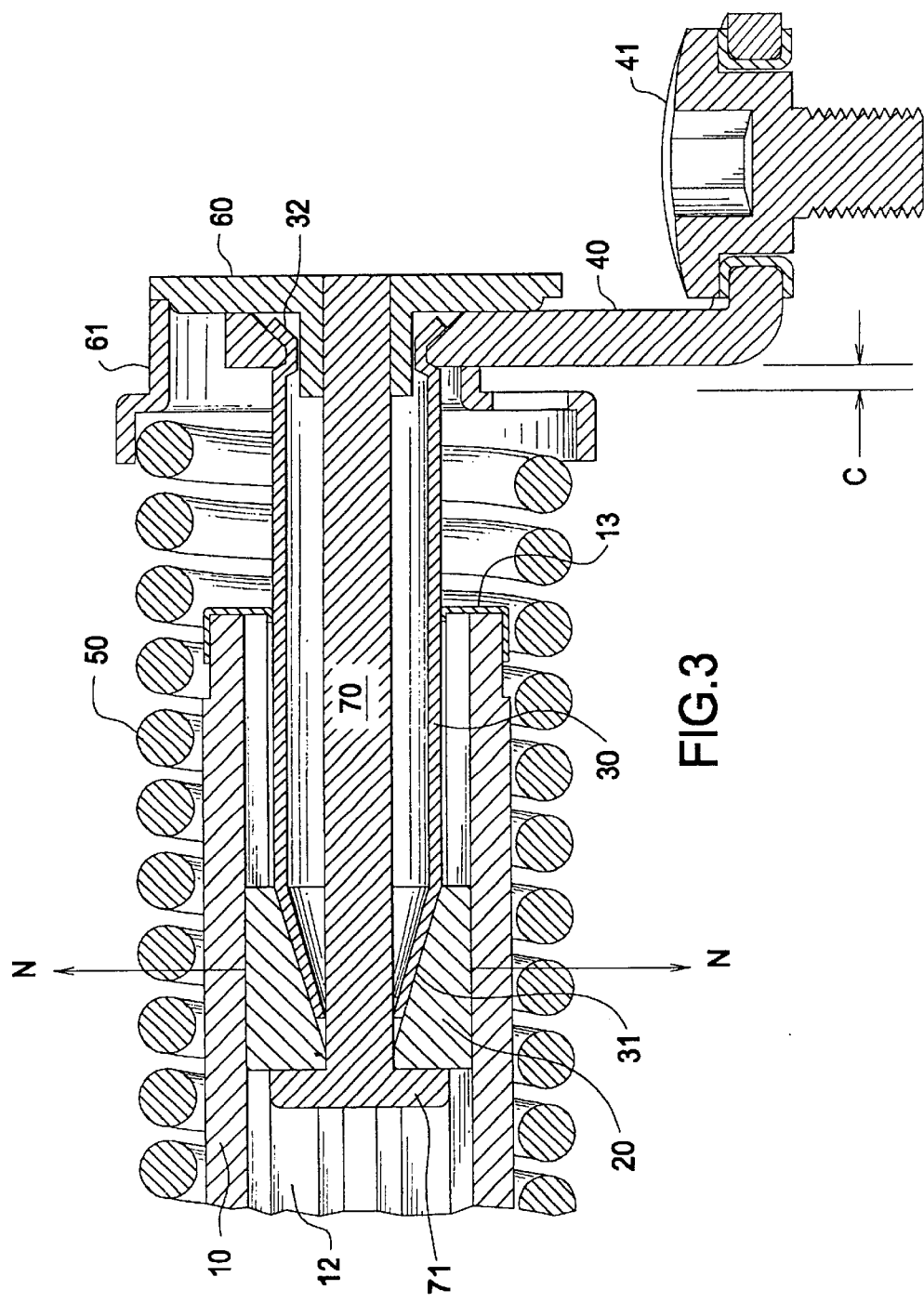

DAMPING STRUT

FIELD OF THE INVENTION

The invention relates to a damping strut, and more particularly to a damping strut having a frictional wedge member cooperatively connected with a load spring to damp a movement.

BACKGROUND OF THE INVENTION

Shock absorbers and struts and more particularly frictional damping struts are used to absorb and damp oscillatory movements in a number of applications. Applications include vehicles and machinery that are subject to repetitive oscillatory movements and vibration. Generally, a load is absorbed by a spring means while oscillations are absorbed and damped by viscous or frictional movement of cooperating parts.

Frictional damping strut assbemblies may be incorporated into a tensioner assembly. A tensioner may be used to preload an engine drive belt in order to maximize operational efficiency and to minimize noise and vibration during belt operation.

Representative of the art is EP 812999B1 (2002) to Bodensteiner which discloses a dual spring tensioning-unit having a damping element with a convex wedge shaped surface that can be contacted with a similar surface on a plunger.

Reference is also made to pending U.S. application Ser. No. 09/954,993 filed Sep. 17, 2001 which discloses a damping strut.

What is needed is a damping strut having a spring cooperatively connected to a radially expandable frictional damping member to provide proportional frictional damping. The present invention meets this need.

SUMMARY OF THE INVENTION

The primary aspect of the invention is to provide a damping strut having a spring cooperatively connected to a radially expandable frictional damping member to provide proportional frictional damping.

Other aspects of the invention will be pointed out or made obvious by the following description of the invention and the accompanying drawings.

The invention comprises a frictional damping strut. An inner damping member is axially engaged with an outer housing. The outer housing is connectable to a tensioner arm. A wedge member connected to an immoveable mounting member is axially engaged with an inner portion of the inner damping member. The outer housing is axially moveable relative to the wedge member. A spring bears upon and urges the outer housing away from an end cap. The end cap comprises a rod, which extends axially within the wedge member and has an end connected to the inner damping member. The rod transmits a spring load force from the end cap to the inner damping member such that the inner damping member radially expands against the outer housing in response to the spring load force, thereby creating a frictional force between the inner damping member and the outer housing which damps an outer housing movement in proportion to the spring force.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 3 is a cross-sectional detail of the strut.

DETAILED DESCRIPTION OF THE PREFERRED EMBODIMENT

Figure 1:
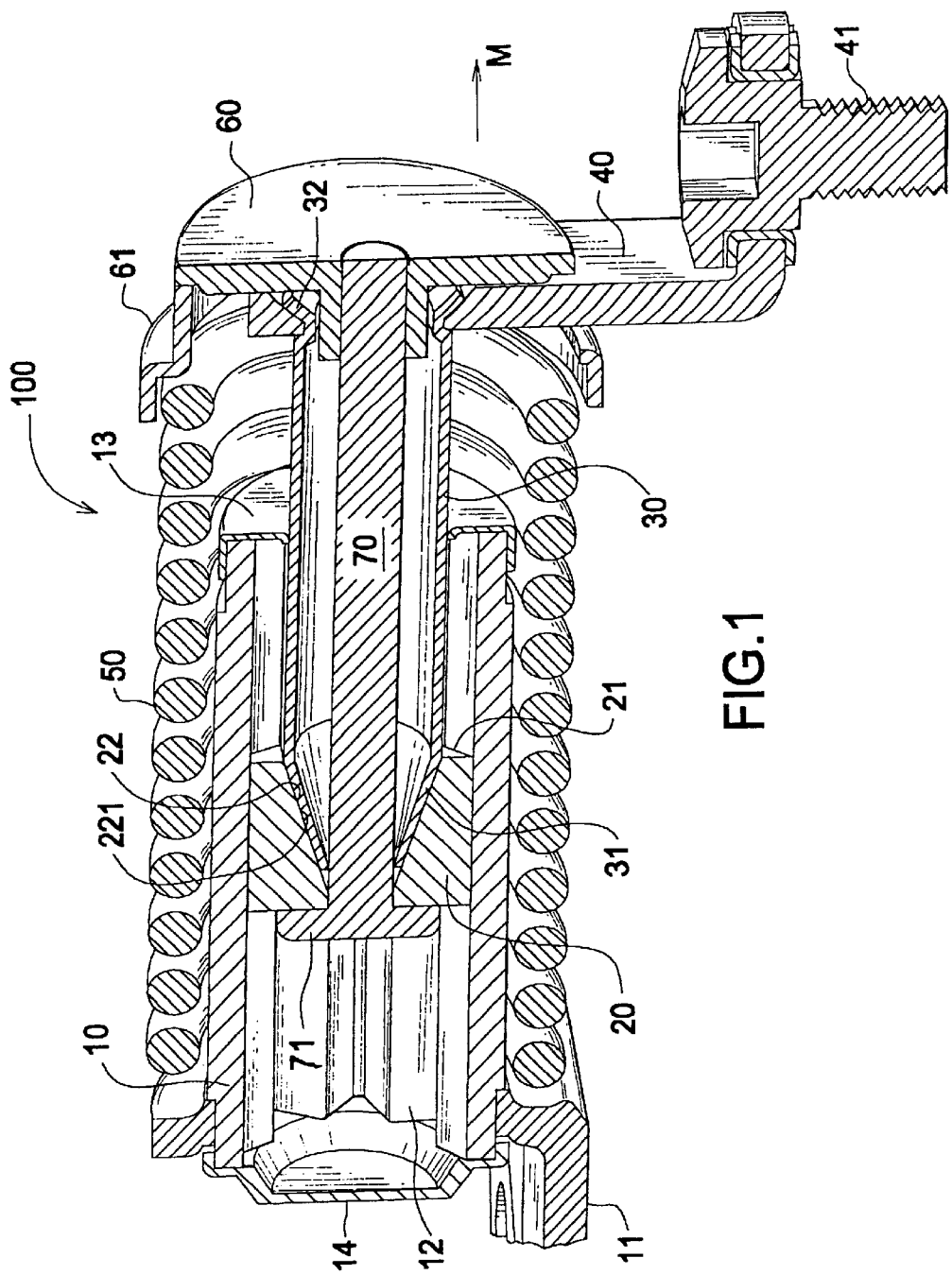
FIG. 1 is a cross-section perspective side view of the strut.

FIG. 1 is a cross-section perspective side view of the strut. The inventive strut 100 comprises an inner damping member 20. Inner damping member 20 comprises an outer surface 21. Outer surface 21 has a predetermined coefficient of friction. The inner damping member may comprise plastic such as PTFE, for example. The inner damping member may comprise any other suitable frictional material, or combination of frictional materials known in the art.

Inner damping member 20 is coaxially engaged with an outer housing 10. Outer housing 10 is substantially cylindrical and comprises an inner surface 12. Outer housing 10 is connectable to a tensioner arm 11, see FIG. 4.

Inner surface 12 has a predetermined coefficient of friction and may comprise a plastic material such as PTFE, for example. The inner surface may comprise any other suitable frictional material, or combination of frictional materials known in the art.

Inner surface 12 is slidingly and frictionally engaged with outer surface 21. Inner surface 12 and outer surface 21 each describe a cooperating profile, for example a circular, star shaped, pleated, or any other form amenable to a sliding engagement. The exemplary form depicted in FIG. 1 is pleated.

Wedge member 30 is coaxially engaged with an inner conical portion surface 22 of inner damping member 20. Wedge member 30 is substantially cylindrical and is coaxially aligned with outer housing 10. An end 32 of wedge member 30 is fixed to an immoveable mounting member 40, rendering wedge member 30 immoveable with respect to outer housing 10. Mounting member 40 is mountable to a surface, such as an engine block (not shown) with a threaded fastener 41. Dust caps 13 and 14 prevent contamination of inner surface 12 and outer surface 21.

End 31 of wedge member 30 has a tapered or conical form that cooperatively engages inner conical portion 221. End 31 is moveably engaged within conical portion 221.

Torsion spring 50 bears upon the outer housing 10 and end cap 60. Arm 11 is fixed to outer housing 10. Spring 50 imparts a load to a belt (not shown) in a belt system of which the strut may be a part, see FIG. 6. Spring 50 acts to urge outer housing 10 axially away from wedge member 30 and end cap 60. End cap 60 is connected to a rod 70. Rod 70 extends coaxially through a wedge member 30 bore. Rod 70 is connected to inner damping member 20 at end 71. End 71 constrains inner damping member 20 between end 71 and tapered end 31. Rod 70 and end cap 60 are moveably engaged with mounting member 40 through wedge member 30. Spring 50, acting through rim 61 end cap 60 and rod 70, compresses inner damping member 20 against end 31.

Inner damping member 20, end 71 and rod 70 may comprise a single part that can be cast or molded. The single part is then easily inserted into and through wedge member 30, and then simply press fit or otherwise connected to end cap 60 during assembly.

Figure 6:
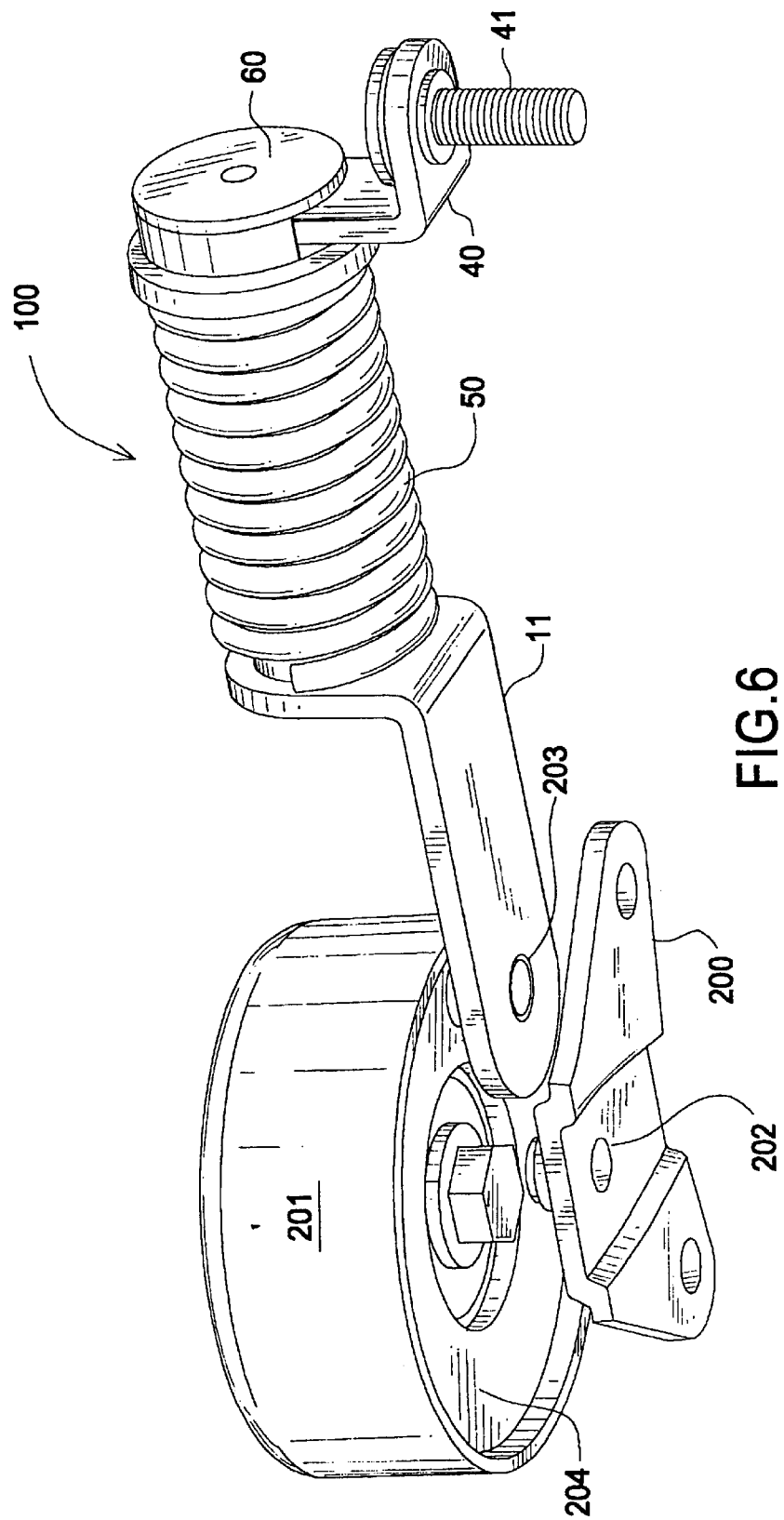
FIG. 6 is a perspective view of the strut in use with a tensioner.

During operation, a belt load is imposed upon member 11 by a belt trained upon pulley 201, see FIG. 6. The belt load is the result of the compressive loading of spring 50, which imposes a spring load force upon rim 61 and end cap 60. The spring characteristics of a torsion spring are known in the art.

Rod 70 transmits the spring load force from the end cap 60 to the inner damping member 20 such that the inner damping member is axially compressed against the wedge member end 31. As inner damping member 20 is compressed against end 31, the inner damping member radially expands against outer housing inner surface 12, thereby creating a frictional force between the inner damping member outer surface 21 and outer housing inner surface 12. The frictional force developed between outer surface 21 and inner surface 12 damps an outer housing movement.

The frictional damping force is proportional to the spring force and hence, belt load. This is because the extent of the radial expansion of the inner damping member, and thereby a magnitude of the frictional force between the inner surface 12 and outer surface 21, is proportional to the spring load force imposed upon the inner damping member 20 through rod 70. As the belt load and spring load force increases, the axial compressive force imposed upon inner damping member 20 increases a like amount. This in turn increases the radial expansion of the inner damping member which increases a normal force (N) exerted by the outer surface 21 upon inner surface 12, see FIG. 3. The resulting frictional force, and hence damping force, is the product of the coefficient of friction of the inner surface and the outer surface and the normal force (N). As the spring force, or belt load, increases, so increases the damping force applied to the outer housing. As the spring force, or belt load, decreases, so decreases the damping force applied to the outer housing.

Figure 2:
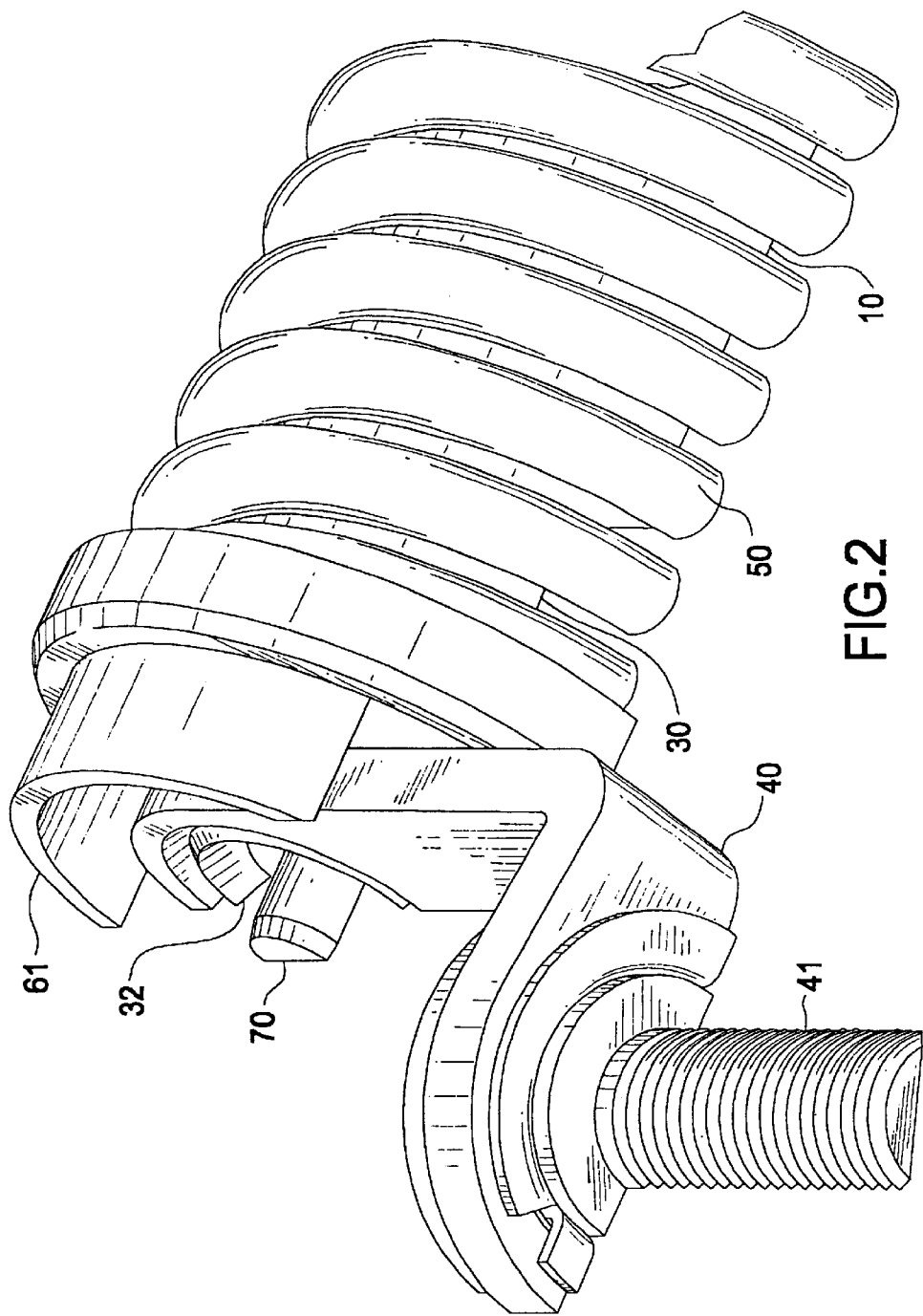
FIG. 2 is a perspective end view of the strut.

FIG. 2 is a perspective end view of the strut. End cap 60 is omitted from FIG. 2. Rim 61 receives an end of spring 50. An end of rod 70 is shown projecting from end 32 of wedge member 30. End 32 is immovably connected to mounting member 40.

Rod 70, end cap 60 (see FIG. 1) and rim 61 are axially moveable in direction M as outer surface 21 wears from use. That is, as outer surface 21 wears by its frictional engagement with inner surface 12, rod 70 will move slightly in direction M in proportion to the amount of wear of outer surface 21. The amount of movement of rod 70 is in the range of up to approximately 5 mm. Such movement of rod 70 has no significant effect upon the load bearing capability of the strut.

FIG. 3 is a cross-sectional detail of the strut. When first placed in operation, a clearance (C) exists between 30 rim 61 and mounting member 40. End cap 60 may actually be 'bottomed' upon mounting member 40. As inner damping member 20 wears, clearance (C) gradually decreases. Collar 62 keeps end cap 60 and rod 70 properly aligned within the end 32 of wedge member 30.

Figure 4:
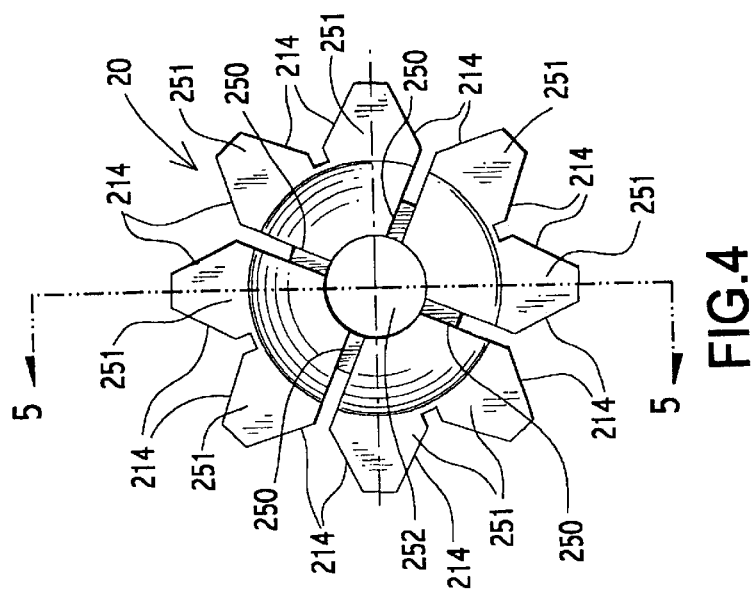
FIG. 4 is a plan view of the inner damping member.

FIG. 4 is a plan view of the inner damping member. Inner damping member 20 comprises a plurality of delta-shaped members 251 that extend radially outward. Outer surface 21, see FIG. 1, comprises surfaces 214 which engage cooperating surfaces on inner surface 12. Slots 250 extend axially and radially through a substantial portion of inner damping member 20. Slots 250 allow inner damping member 20 to radially expand as it is compressed on end 31 of wedge member 30.

Figure 5:
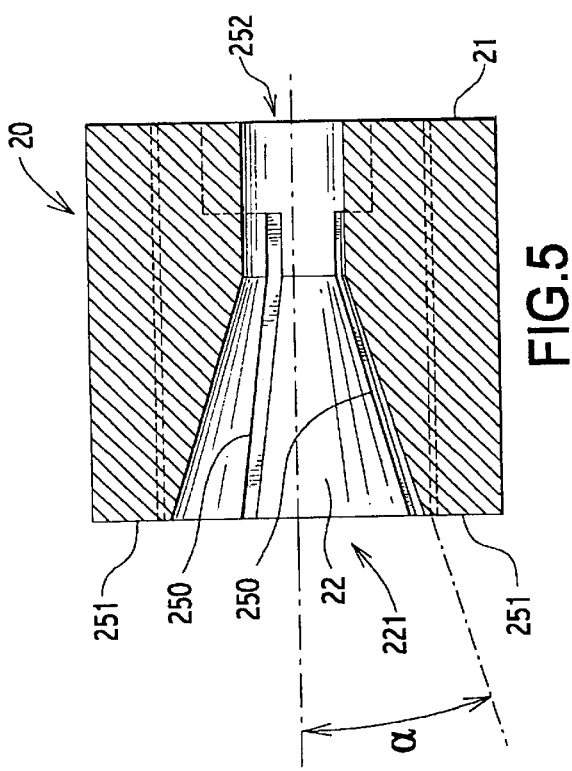
FIG. 5 is a side cross-section view of the inner damping member at line 5—5 in FIG. 4.

FIG. 5 is a side cross-section view of the inner damping member at line 5—5 in FIG. 4. Conical portion 221 engages end 31 of wedge member 30. Rod 70 extends through hole 252. Conical portion 221 describes an angle α in the range of approximately 5° to 50°. Slots 250 extend radially and axially in inner damping member 20 to facilitate a radial expansion of the inner damping member.

FIG. 6 is a perspective view of the strut in use with a tensioner. An end of arm 11 is pivotally connected to tensioner arm 204 at pivot 203. Arm 204 is pivotally connected to base 200 at pivot 202. Base 200 is mountable to any surface, for example, to an engine block, not shown. Pulley 201 is journaled to arm 204. Pulley 201 may comprise any desired belt bearing surface profile, such as the flat profile shown in FIG. 6. A belt in a belt drive system (not shown) is typically trained about pulley 201. The inventive strut applies a load to the belt, as well as damps an oscillatory movement of the belt and tensioner arm.

Figure 7:
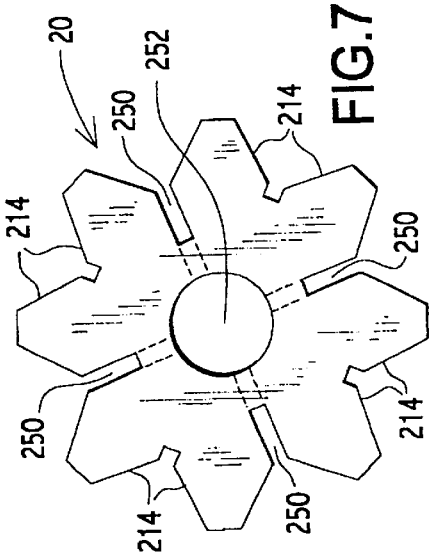
FIG. 7 is a plan view of the inner damping member.

FIG. 7 is a plan view of the inner damping member. Slots 250 extend radially from conical portion 221 to allow radial expansion of the inner damping member.

Although a single form of the invention has been described herein, it will be obvious to those skilled in the art that variations may be made in the construction and relation of parts without departing from the spirit and scope of the invention described herein.

I claim:

1. A strut comprising:

a first member having an inner surface;

a wedge member immovably fixed with respect to the first member;

the wedge member having a tapered end;

a second member frictionally engaged with the inner surface and the tapered end, the second member radially expandable;

a spring engaged between the first member and an end member;

the end member directly connected to the second member whereby a spring force radially expands the second member against the inner surface, thereby proportionally damping a first member movement.

2. The strut as in claim 1, wherein the first member is substantially cylindrical.

3. The strut as in claim 1, wherein the inner surface has a pleated profile.

4. The strut as in claim 3, wherein the second member has a pleated profile to cooperatively engage the inner surface.

5. The strut as in claim 1 further comprising:

a rod for connecting the end member to the second member;

the rod coaxially disposed within the wedge member; and the rod moveable with respect to the wedge member.

6. The strut as in claim 1 wherein the second member further comprises at least one slot whereby the second member is radially expandable.

7. A strut comprising:

a spring having a spring force;

a moveable cylindrical first member directly engaged with the spring and having an inner frictional surface;

a damping member bearing upon a tapered member;

the damping member radially expandable against the inner frictional surface upon urging toward the tapered member by the spring force, whereby a first member movement is damped; and means for connecting the spring to the damping member.

8. The strut as in claim 7, wherein the inner frictional surface describes a pleated form.

9. The strut as in claim 7, wherein the tapered member is immoveable with respect to the damping member.

10. The strut as in claim 7, wherein the means for connecting the spring to the damping member is coaxial with the tapered member.

11. The strut as in claim 7, wherein the damping member is coaxial with the first member.

12. The strut as in claim 7, wherein the spring is connected to the first member.

13. The strut as in claim 7, wherein the damping member further comprises at least one slot.

14. A strut comprising;
a first member having an inner surface;
a fixed member having a tapered end;
a damping member frictionally engaged with the inner surface and cooperatively engaged with the tapered end;
the damping member radially expandable upon a movement toward the tapered end;
a biasing member directly connected between the damping member and the first member, the biasing member resisting an axial movement of the first member; and
the biasing member urging the damping member toward the tapered end, whereby the damping member proportionally damps a first member movement.

15. The strut as in claim 14, wherein the damping member further comprises at least one slot.

16. A damping strut comprising:
a tapered member connectable to a mounting surface;
a cylindrical member moveable with respect to and coaxially aligned with the tapered member;
a damping member engaged with the tapered member;
the damping member frictionally engaged with the cylindrical member and the damping member radially expandable when compressed toward the tapered member;
a spring axially urging the cylindrical member away from the tapered member; and
the spring compressing the damping member toward the tapered member whereby a cylindrical member movement is proportionally damped.

17. The strut as in claim 16 wherein the damping member further comprises at least one slot.

18. The strut as in claim 16 wherein the damping member further comprises a conical portion for engaging the tapered member.

* * * * *